United States Patent
Park

(10) Patent No.: US 9,570,772 B2
(45) Date of Patent: Feb. 14, 2017

(54) POWER PRODUCTION APPARATUS AND STRUCTURE BLOCK SYSTEM FOR WATER STORAGE FACILITY

(71) Applicant: BOMECOTEC CO., LTD., Seoul (KR)

(72) Inventor: Jae Won Park, Seoul (KR)

(73) Assignee: BOMECOTEC CO., LTD., Seoul (KR)

( * ) Notice: Subject to any disclaimer, the term of this patent is extended or adjusted under 35 U.S.C. 154(b) by 0 days.

(21) Appl. No.: 14/375,616

(22) PCT Filed: Sep. 3, 2013

(86) PCT No.: PCT/KR2013/007934
§ 371 (c)(1),
(2) Date: Jul. 30, 2014

(87) PCT Pub. No.: WO2014/181933
PCT Pub. Date: Nov. 13, 2014

(65) Prior Publication Data
US 2016/0099479 A1    Apr. 7, 2016

(30) Foreign Application Priority Data

May 8, 2013   (KR) .................. 10-2013-0051776
Aug. 2, 2013  (KR) .................. 10-2013-0092006

(51) Int. Cl.
*H01M 8/06* (2016.01)
*E03F 5/10* (2006.01)
(Continued)

(52) U.S. Cl.
CPC .............. *H01M 8/0656* (2013.01); *E03F 5/10* (2013.01); *H01M 8/02* (2013.01);
(Continued)

(58) Field of Classification Search
CPC .............. H01M 8/0656; H01M 8/0606; H01M 8/04029; H01M 8/04208; E03F 5/10
See application file for complete search history.

(56) References Cited

U.S. PATENT DOCUMENTS 7,575,823 B2    8/2009   Kabasawa
7,935,451 B2    5/2011   Kabasawa
(Continued)

FOREIGN PATENT DOCUMENTS

KR    10-2003-0073674 A    9/2003
KR    10-2003-0073679 A    9/2003
(Continued)

OTHER PUBLICATIONS

Machine translation of KR 2003-0073679, obtained Feb. 17, 2016.*
JP 2006-079955 A (Casio Comput Co. Ltd.) Mar. 23, 2006 corresponds to U.S. Pat. No. 7,575,823.

*Primary Examiner* — Nicholas P D'Aniello
(74) *Attorney, Agent, or Firm* — Nixon & Vanderhye P.C.

(57) ABSTRACT

The invention relates to an electric power generation system for a water storage tank and a storage structure system for a water storage tank wherein the electric power generation system for the water storage tank according to the invention comprises: a water storage tank for storing rainwater or water underground for a specific purpose; an electricity generation part for generating electricity by utilizing water stored in the water storage tank; a cooling part for cooling heat generated at the time of generating electricity by the electricity generation part; and a cooling water supply part for supplying the cooling part with the water stored in the water storage tank. Thereby, dispersed electricity generation facilities can be secured by utilizing open underground spaces of the water storage tank.

9 Claims, 12 Drawing Sheets

(51) Int. Cl.
*H01M 16/00* (2006.01)
*H01M 8/04* (2016.01)
*H01M 8/02* (2016.01)
*H01M 8/10* (2016.01)

(52) U.S. Cl.
CPC ... *H01M 8/04029* (2013.01); *H01M 8/04208* (2013.01); *H01M 8/0606* (2013.01); *H01M 16/006* (2013.01); *H01M 2008/1095* (2013.01); *Y02E 60/50* (2013.01)

(56) References Cited

U.S. PATENT DOCUMENTS

| | | | | |
|---|---|---|---|---|
| 2005/0000802 | A1* | 1/2005 | Hobbs | C01B 3/34 204/277 |
| 2006/0057445 | A1 | 3/2006 | Kabasawa | |
| 2009/0274939 | A1 | 11/2009 | Kabasawa | |
| 2010/0193531 | A1* | 8/2010 | Droomer | E03F 1/005 220/694 |
| 2010/0304238 | A1* | 12/2010 | Ku | C01B 3/065 429/423 |
| 2016/0076509 | A1* | 3/2016 | Im | F03B 13/06 60/398 |

FOREIGN PATENT DOCUMENTS

| | | | |
|---|---|---|---|
| KR | 2003-0073679 | * | 9/2003 |
| KR | 10-0553086 B1 | | 2/2006 |
| KR | 10-0750057 B1 | | 8/2007 |

* cited by examiner (a)

(b)

POWER PRODUCTION APPARATUS AND STRUCTURE BLOCK SYSTEM FOR WATER STORAGE FACILITY

This application is the U.S. national phase of International Application No. PCT/KR2013/007934 filed 3 Sep. 2013 which designated the U.S. and claims priority to KR 10-2013-0051776 filed 8 May 2013, and KR 10-2013-0092006 filed 2 Aug. 2013, the entire contents of each of which are hereby incorporated by reference.

TECHNICAL FIELD

The present invention relates to an electric power generation system for a water storage tank and a storage structure system for a water storage tank. In particular, the present invention relates to an electric power generation system for a water storage tank which is capable of generating an electric power from a storage structure for a water storage tank storing rainwater, etc. and to a storage structure system for a water storage tank which serves to reinforce vertical strength and distortion strength in the horizontal direction and is provided with an electric power generation system.

BACKGROUND OF THE INVENTION

Conventional regeneration or power generation systems are a fueled power generation facility, a solar heat power generation facility or a wind power facility, etc. and have mainly been installed on the ground, which is very costly. Accordingly, due to this problem, they had much difficulties in being widely used as an urban power generation plant. Thus, recently the inventors began to review the method of using a power generation system for generating electric power by utilizing water, as an urban power generation plant.

The sewerage system is a generic term for conduits installed to collect and process home foul water, industrial water waste, rain and underground water, etc., discharged from various areas, and for other structures and facilities. Recently water storage facilities for storing water underground are being used in such sewerage system in order to prevent flood damage due to rain, etc., and to prevent temporal overflow of the river in case heavy rain falls intensively.

Example of these water storage facilities is disclosed in Japanese patent application publication No. 2000-352080. Example of a unit member of Japanese patent application publication No. 2000-352080 is illustrated in FIG. 1. The unit member (A), as shown in FIG. 1, includes a base portion 110 of a rectangular shape and a container portion 120 arranged such that it is integrally projected from the base portion 110. In addition, the unit member (A) has four container portions 120 formed symmetrically relative to a center. Example showing the configuration in which such unit members (A) are assembled in the top and bottom manner is illustrated in FIG. 2.

However, in case a water storage tank is configured by utilizing such unit member (A) only, the water storage tank is likely to collapse due to the load of soil, etc., and an installation space for generating electricity cannot be secured.

SUMMARY OF THE INVENTION

To solve the above problems, the object of the invention is to provide an electric power generation system for a water storage tank capable of electric power from a storage structure for a water storage tank storing rainwater, etc., and a storage structure system for a water storage tank having reinforced vertical strength and distortion strength in the horizontal direction and having an electric power generation apparatus.

To achieve the above object, according to an embodiment of the invention, an electric power generation system for a water storage tank may comprise: a water storage tank for storing rainwater or water underground for a specific purpose; an electricity generation part for generating electricity by utilizing water stored in the water storage tank; a cooling part for cooling heat generated at the time of generating electricity by the electricity generation part; and a cooling water supply part for supplying the cooling part with the water stored in the water storage tank.

According to a further embodiment of the system, the electric power generation system for a water storage tank may further comprise: a filter for filtering water flowing into the electricity generation part from the water storage tank; a stack module for configuring the electricity generating part; and a catalyst module for supplying the stack module with hydrogen wherein the hydrogen is generated by utilizing water filtered by the filter.

According to a further embodiment of the system, the catalyst of the catalyst module may be formed of a plate shape or of a powder mixture comprising hydride powder and oxide powder.

According to a further embodiment of the system, the electric power generation system for a water storage tank may further comprise: a fuel supply part for supplying fuel including hydrogen; and a reforming part for supplying the electricity generation part with hydrogen obtained from fuel which is supplied from the fuel supply part.

According to a further embodiment of the invention, the electric power generation system for a water storage tank may further comprise: a hydrogen generation stack part for generating hydrogen by using water supplied from a water supply part for stack and electricity supplied from an electric power supply part; and a hydrogen storage part for storing hydrogen generated from the hydrogen generation stack part.

According to a further embodiment of the invention, the electricity generation part may have a fuel cell stack structure in which a plurality of unit cells are stacked.

According to a further embodiment of the invention, the fuel cell stack structure may be a helical type or a cylindrical type in case it is arranged within a cylinder.

According to a further embodiment of the invention, the electric power generation system for a water storage tank may further comprise a hot water pipe for heat utilization for transferring water heated in the cooling part to a hot water pipe or a heating pipe of a house or a building.

According to other embodiment of the invention, a storage structure system for a water storage tank may comprise: a first unit member including a first base portion arranged on a bottom ground of the water storage tank and a first container portion arranged such that it is integrally and vertically projected from the first base portion; a second unit member comprising a second base portion arranged on a ceiling of the water storage tank and covered with soil and a second container portion protruded vertically from the second base portion; a reinforcing column provided in order to reinforce vertical strength, in the interior of the container portions formed by up and down assembling of the first unit member and the second unit member; and an electric power generation system for generating electric power by utilizing water supplied into the inside of the reinforcing column.

According to a further embodiment of the invention, the reinforcing column may be formed by interconnecting an upper partition column, at least one medium partition column and a lower partition column.

According to a further embodiment of the invention, the upper partition column of the reinforcing column may be provided with an upper seat plate for supporting a ceiling of the water storage tank and the lower partition column of the reinforcing column may be provided with a lower seat plate for supporting a bottom of the water storage tank.

According to a further embodiment of the invention, the upper partition column, the middle partition column and the lower partition of the reinforcing column may be connected by means of a screw combination; and the middle partition column is adjustable in length.

According to a further embodiment of the invention, the electric power generation system may comprise an electricity generation part for generating electricity by means of an electrochemical reaction of hydrogen and oxygen; a cooling part for cooling heat generated at the time of generating electricity by the electricity generation part; and a cooling water supply part for supplying the cooling part with water stored in the water storage tank.

According to a further embodiment of the invention, the electric power generation system may further comprise: a filter for filtering water flowing into the interior of the reinforcing column; a stack module including the electricity generation part; and a catalyst module for supplying the stack module with hydrogen generated by utilizing water filtered by the filter.

According to a further embodiment of the invention, the electric power generation system may further comprise: a fuel supply part for supplying fuel including hydrogen; and a reforming part for supplying the electricity generation part with hydrogen obtained from fuel which is supplied from the fuel supply part.

According to a further embodiment of the invention, the electric power generation system may further comprise: a hydrogen generation stack part for generating hydrogen by using the water supplied from a water supply and the electricity supplied from an electric power supply part; and a hydrogen storage part for storing hydrogen generated from the hydrogen generation stack part.

According to the above configurations of the invention, strength enduring the load from the upper side and strength enduring the load in the right and left horizontal directions may be reinforced and the water storage tanks may be constructed in the urban areas.

Further, according to the invention, an urban type of electric power generation plant for a water storage tank allows a low carbon city design through reutilization of the resources to be realized.

DETAILED DESCRIPTION OF THE PREFERRED EMBODIMENTS

The storage structioon for a water storage tank which is reinforced in terms of strength and has an electric power generation function according to exemplary embodiments of the invention, will be described in more detail below with reference to the accompanying drawings.

Figure 3:
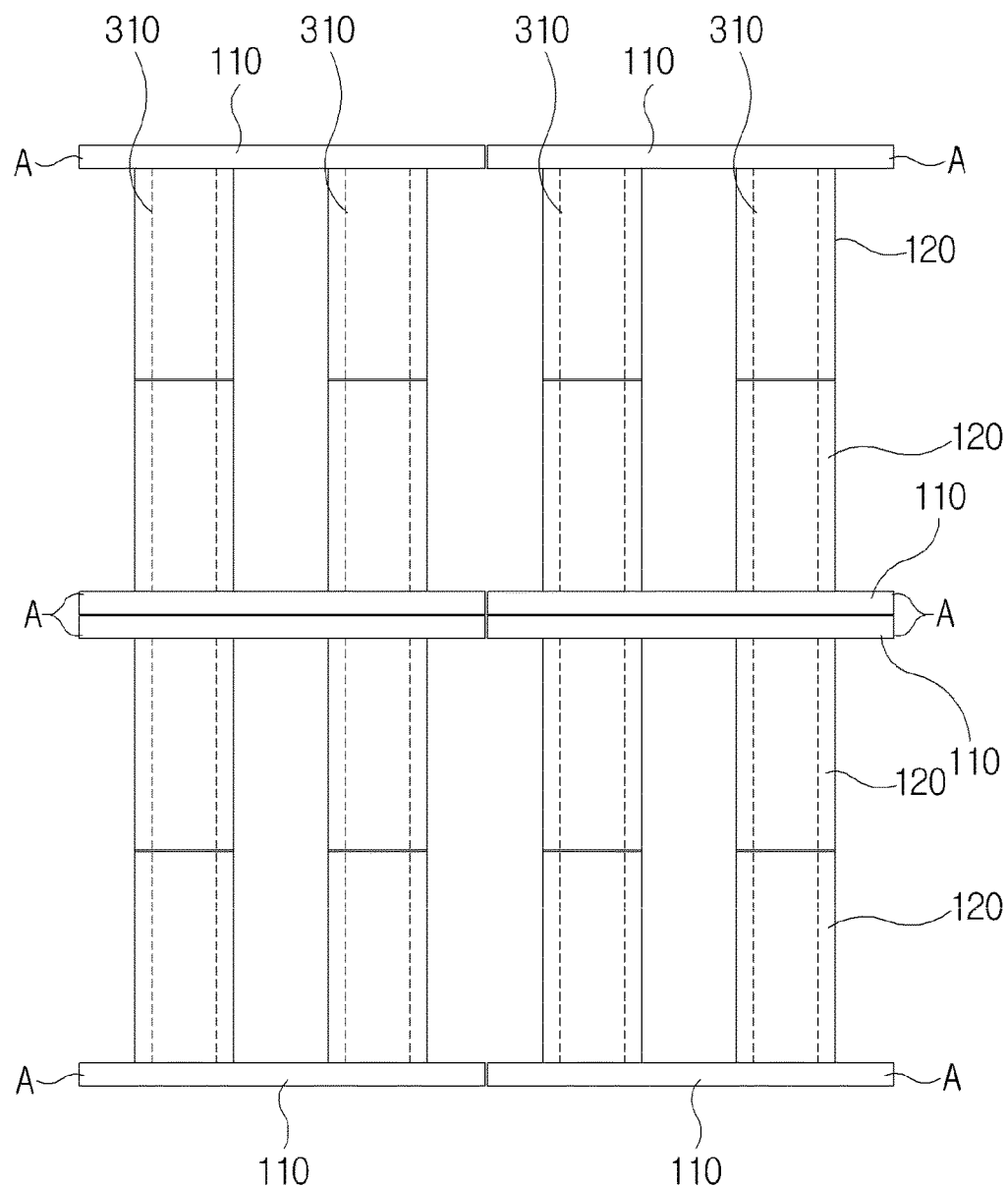
FIG. 3 illustrates a storage structure for a water storage tank provided with a reinforcing column according to an embodiment of the invention.
Figure 4:
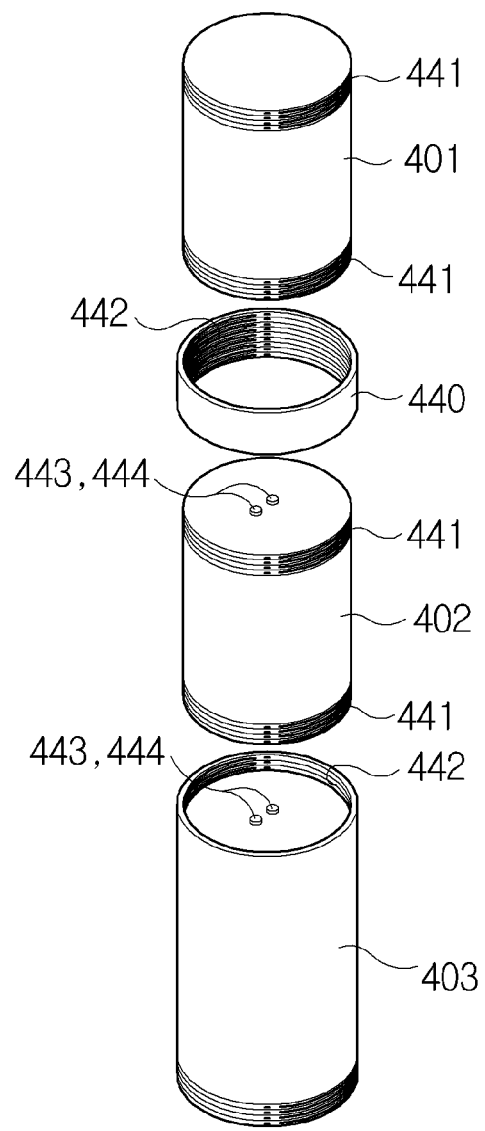
FIG. 4 illustrates an example of the reinforcing column shown in FIG. 3.
Figure 5:
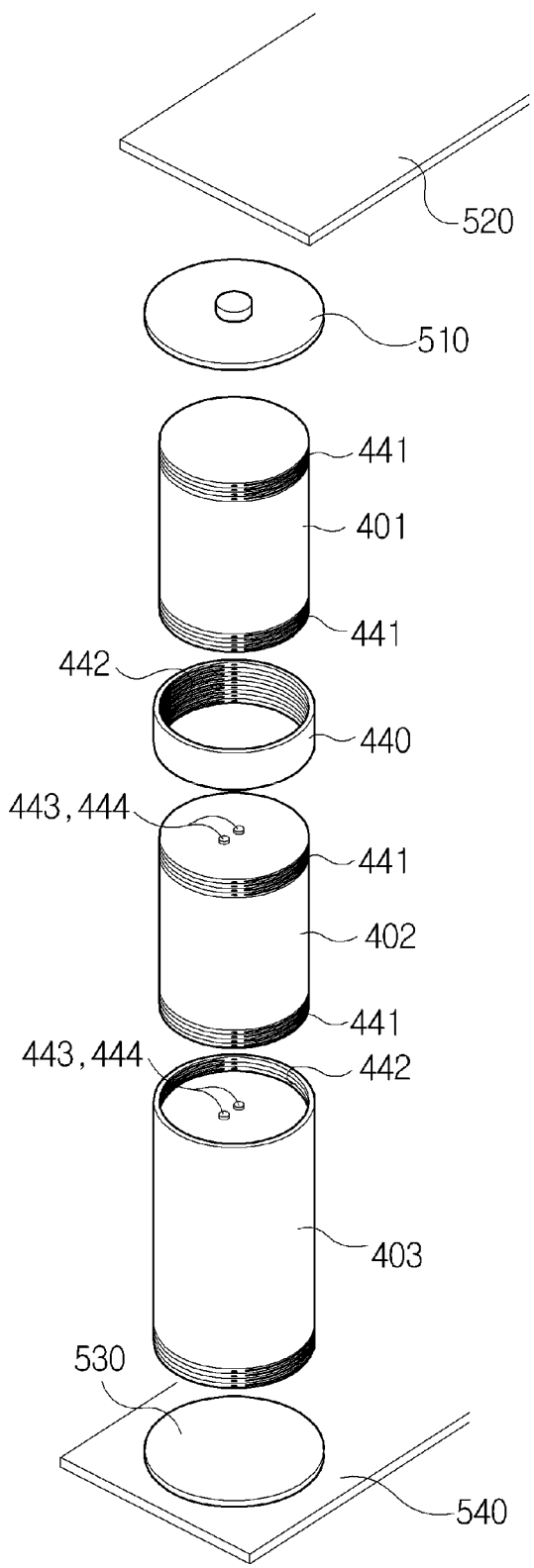
FIG. 5 illustrates an example in which the reinforcing column shown in FIG. 4 is provided with floor decks.

FIG. 3 illustrates a storage structure for a water storage tank provided with reinforcing columns according to one embodiment according to the invention. FIG. 4 illustrates an example of the reinforcing column shown in FIG. 3. FIG. 5 illustrates an example in which the reinforcing column shown in FIG. 4 is provided with floor decks.

Figure 1:
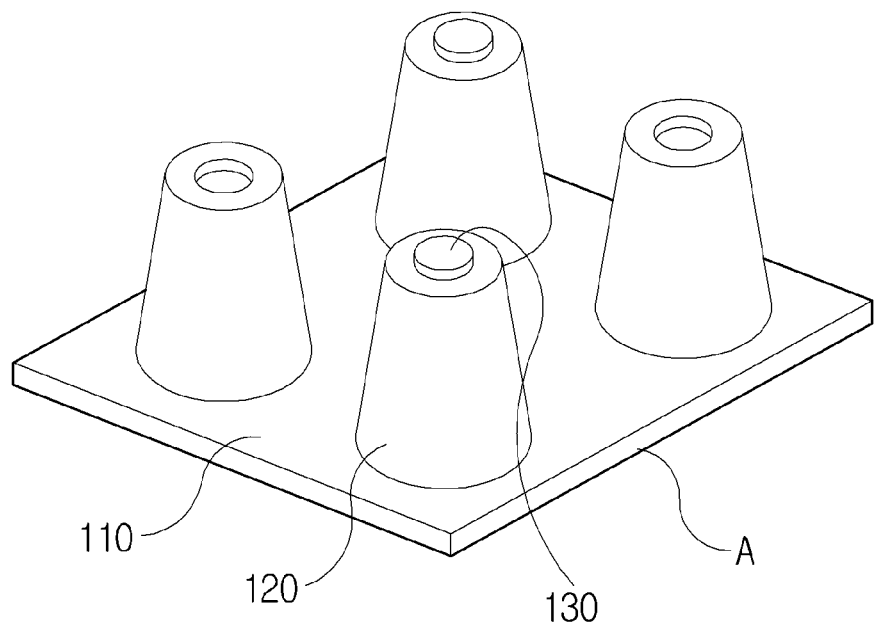
FIG. 1 illustrates an example of a unit member according to the prior art used in a water storage tank.
Figure 2:
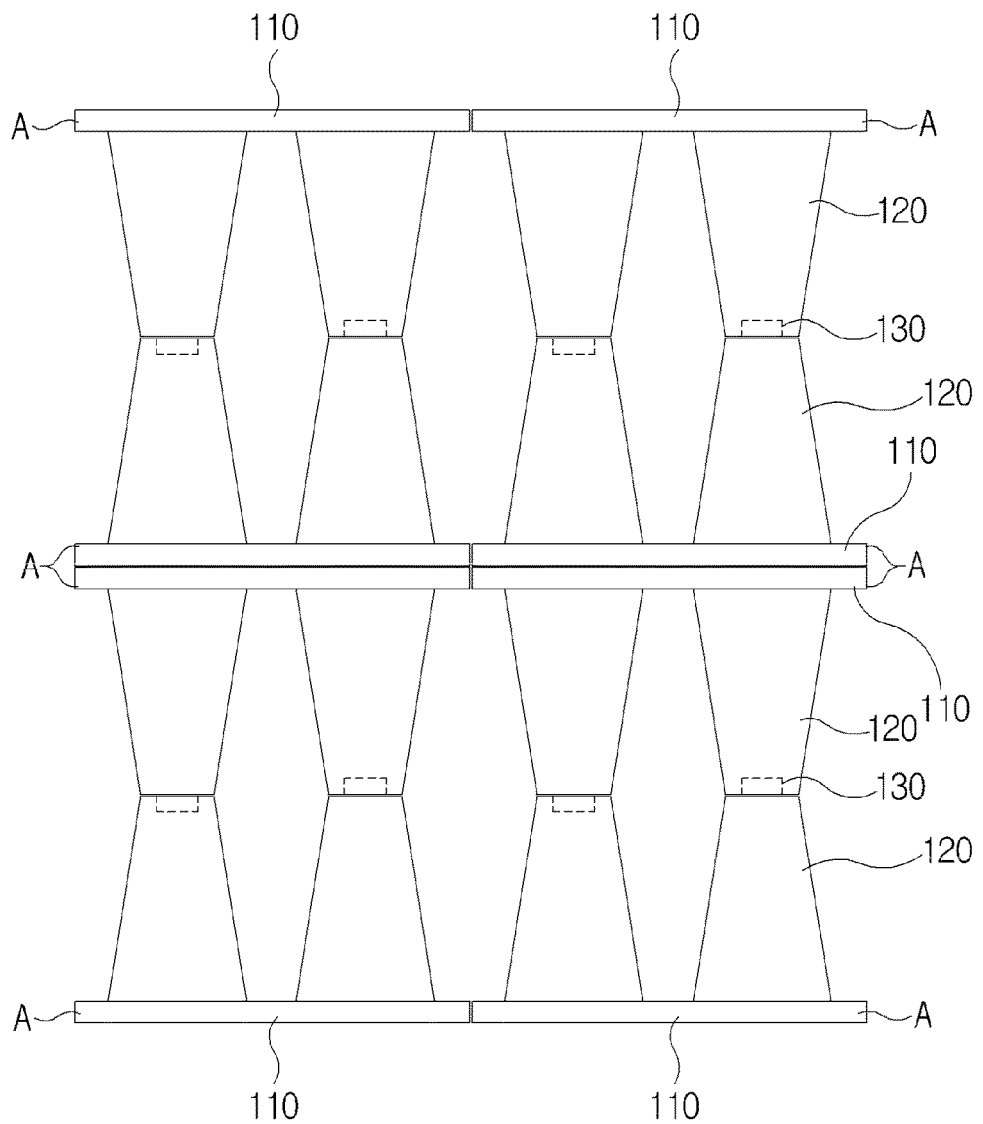
FIG. 2 illustrates the lamination stack state of a unit member according to FIG. 1 in which a plurality of unit member are assembled upward and downward.

A unit member (A) of FIG. 3, as shown in FIG. 1, includes a base portion 110 of a rectangular shape and a container portion 120 arranged such that it is integrally projected from the base portion 110. A bottom end of the base portion 110 is arranged on a bottom ground of the water storage tank; and a top end of the base portion 110 is arranged on a ceiling of the water storage tank and covered with soil.

Further, as shown in FIG. 3, the unit members (A) are connected to each other upwards and downwards and at the interior of the container portion 120 is provided with a reinforcing member 310 in order to reinforce vertical strength of the unit member A. A connection structure for connecting one unit member A and the other unit member A is designed not to have influence on the reinforcing column 310 provided in the interior of the container portion 120.

The reinforcing column 310 according to the invention is preferable to be metal material. Also, the reinforcing column 310 is preferable to form as one-piece component without a connection portion such that it receives (supports) load as a whole in the interior of the water storage tank but, as the need arises, a plurality of reinforcing columns 310 can also be connected to each other. In addition, the reinforcing column 310 can also be provided over the whole of the connected container portion 120 to reinforce strength in the vertical direction but can also be provided only on a portion of the connected container portion 120.

FIG. 4 illustrates an example of the reinforcing column 310 shown in FIG. 3, in which the reinforcing column 310 are formed by connecting a plurality of partition columns.

As shown in FIG. 4, the reinforcing column 310 includes a plurality of partition columns 401, 402, and 403, i.e., an upper partition column 401, at least one medium partition column 402, and a lower partition column 403. The reinforcing column 310 is configured into one long tube shape by connecting a plurality of partition columns 401, 402 and 403.

At this time, each of partition columns 401, 402 and 403 has a female screw portion 442 or a male screw portion at the ends of the upper side and the lower side and is connected with other partition column by screw joint.

Meanwhile, each of partition columns 401, 402 and 403 may also have only a female screw portion or only a male screw portion at the end thereof. In this case the partition columns are connected with each other by means of a joint member 440 of a ring shape in which a male screw portion or a female screw portion is formed.

In this way, the connection of partition columns 401, 402 and 403 by means of a screw combination allows the total length of the reinforcing column 310 to be adjusted. Therefore, the reinforcing column 310 can be tightly fixed to the water storage tank by sticking the top end of the upper partition column 401 and the bottom end of the lower partition column 402 of the reinforcing column 310 to the ceiling and the bottom of the water storage tank, respectively. Thereby, the strength in the vertical direction of the storage structure for the water storage tank can be enhanced and the distortion in the horizontal direction thereof can be prevented.

The reinforcing column 310 which is formed by connecting a plurality of partition columns 401, 402 and 403 can form one space as a whole at its interior. However, as shown in FIG. 4, partition columns can form respective separate spaces per partition column. In this case, as will be described below, each of the partition columns 401, 402 and 403 can embed a catalyst module 630 and a stack module 640 for electric power generation. At this time, each of the partition columns 401, 402 and 403 can also be configured such that a wiring may be drawn out of the side of each of the partition columns. However, as shown in FIG. 4, wiring terminals 443, 444 can be provided at the top end and the bottom end of the partition column so that when two partition columns are connected by means of the screw combination, the wiring terminals of the lower partition column and the wiring terminals of the upper partition column can also be electrically connected to each other. Thereby, the reinforcing column 310 has the enhanced working convenience and durability because a separate wiring does not need to be exposed to the exterior of the reinforcing column 310.

Meanwhile, when each reinforcing column 310 is screw joined, an appropriate waterproof seal means such as a rubber packing can be applied to a screw combination portion such that water in the water storage tank does not reach a wire terminal through a screw combination.

Further, the screw portion of each partition column is formed of metal and preferably further heat treated in order to enhance strength in the vertical and horizontal directions over the whole of the reinforcing column 310.

Meanwhile, as the reinforcing column 310 is always in contact with water in the water storage tank, it can be made of oxidation-resistant material such as stainless steel and plastic resin or can be coated with antioxidant, in order to prevent oxidation caused by water.

Further, the upper partition column 401 and the lower partition column 403 of the reinforcing column 310 can be provided with seat plates in order to tightly fix the storage structure to the ceiling and the bottom of the water storage tank. This example is shown in FIG. 5. As shown in FIG. 5, the upper partition column 401 of the reinforcing column 310 is provided with an upper seat plate 510 and the lower partition column 403 of the reinforcing column 310 is provided with a lower seat plate 530. These upper seat plate 510 and lower seat plate 530 of the reinforcing column 310 can be formed of the shape of a dish. Also, a middle partition column 402 of the reinforcing column 310 can be different in length from the other two partition columns thereof in order to adjust the total length of the reinforcing column 310.

Further, the upper seat plate 510 can be provided with an upper floor deck 520 by means of a connection portion of the upper floor deck and in the same manner the lower seat plate 530 can be provided with a lower floor deck 540 by means of a connection portion of the lower floor deck. Thereby, strength in the horizontal direction of the reinforcing column can be dispersed.

An electric power generation system for generating an electric power by utilizing water is inserted into the interior of the reinforcing column 310 of the invention. Thereby, an electric power can be generated by utilizing the space of the water storage tank for simply storing water.

Figure 6:
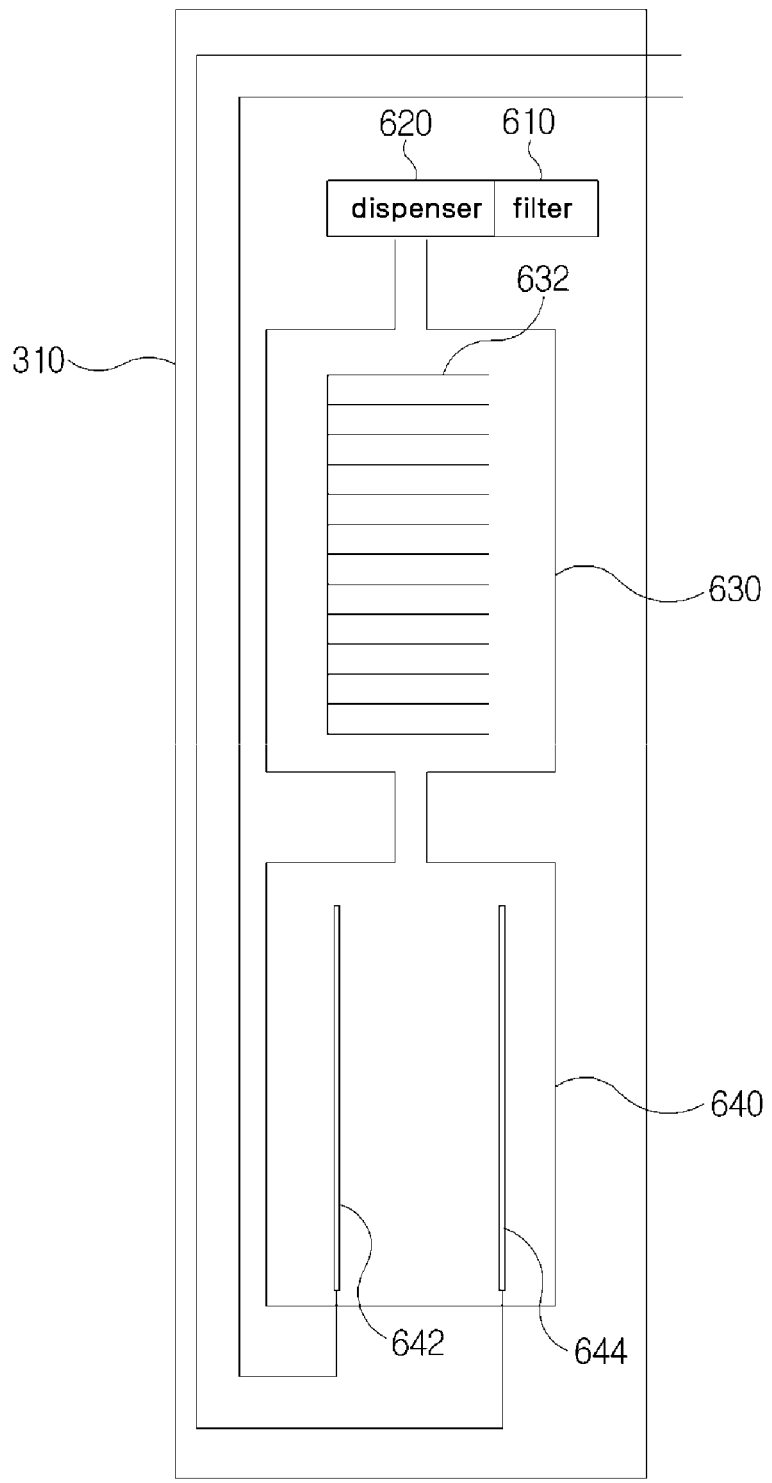
FIG. 6 schematically illustrates an electric power generation system for the water storage tank according to one embodiment of the invention.

FIG. 6 schematically illustrates an electric power generation system for the water storage tank according to one embodiment of the invention.

As described above, the reinforcing column 310 can be formed of the shape of a hollow tube. The reinforcing column 310 of the shape of a tube is sealed at the top end and the bottom end thereof. Although not shown in FIG. 6, when the reinforcing column 310 is not perfectly sealed against water, a separate capsule can be further provided at the interior of the reinforcing column.

As shown in FIG. 6, at the interior of the reinforcing column (310), a catalyst module 630 and a stack module 640 are provided and a filter 610 for filtering water stored in the water storage tank and a dispenser 620 for controlling the amount of water filtered by the filter 610 are also provided.

The catalyst module 630 is provided with a catalyst for generating hydrogen by using water. The catalyst 632 can be arranged in the shape of a plate and can also be in the form of powder. A mixed powder comprising hydride powder and oxide powder can be used as a catalyst in the form of powder.

If the catalyst module 630 is supplied with water the supply amount of which is adjusted by the dispenser 620, hydrogen is generated by a catalyst. The stack module 640 is provided with hydrogen generated in the catalyst module 630 via the connected supply pipe.

The stack module 640 is provided with a fuel battery cell. Solid state polymer fuel battery is used as a fuel battery cell. In this solid state state polymer fuel battery, fuel pole 642 and oxygen pole 644 are arranged in the polymer electrolyte fuel cell by inserting a polymer electrolyte membrane having, for example sulfonic acid group or phosphate group. If fuel (hydrogen) or oxygen is supplied to these poles 642 and 644, Hydrogen ion (proton) generated in the fuel pole (anode) 642 reaches the oxygen pole (cathode) 644 via the polymer electrolyte membrane and hydrogen ion and oxygen are reacted on the catalyst of the oxygen pole 644, thus oxidation-reduction reaction occurs to obtain electricity.

Stack module 640 is arranged in the lower portion of the reinforcing column 310 in FIG. 6 but it is also possible that the catalyst module 630 is the lower portion of the reinforcing column 310 and the stack module 640 is arranged above the catalyst module 630.

Figure 7:
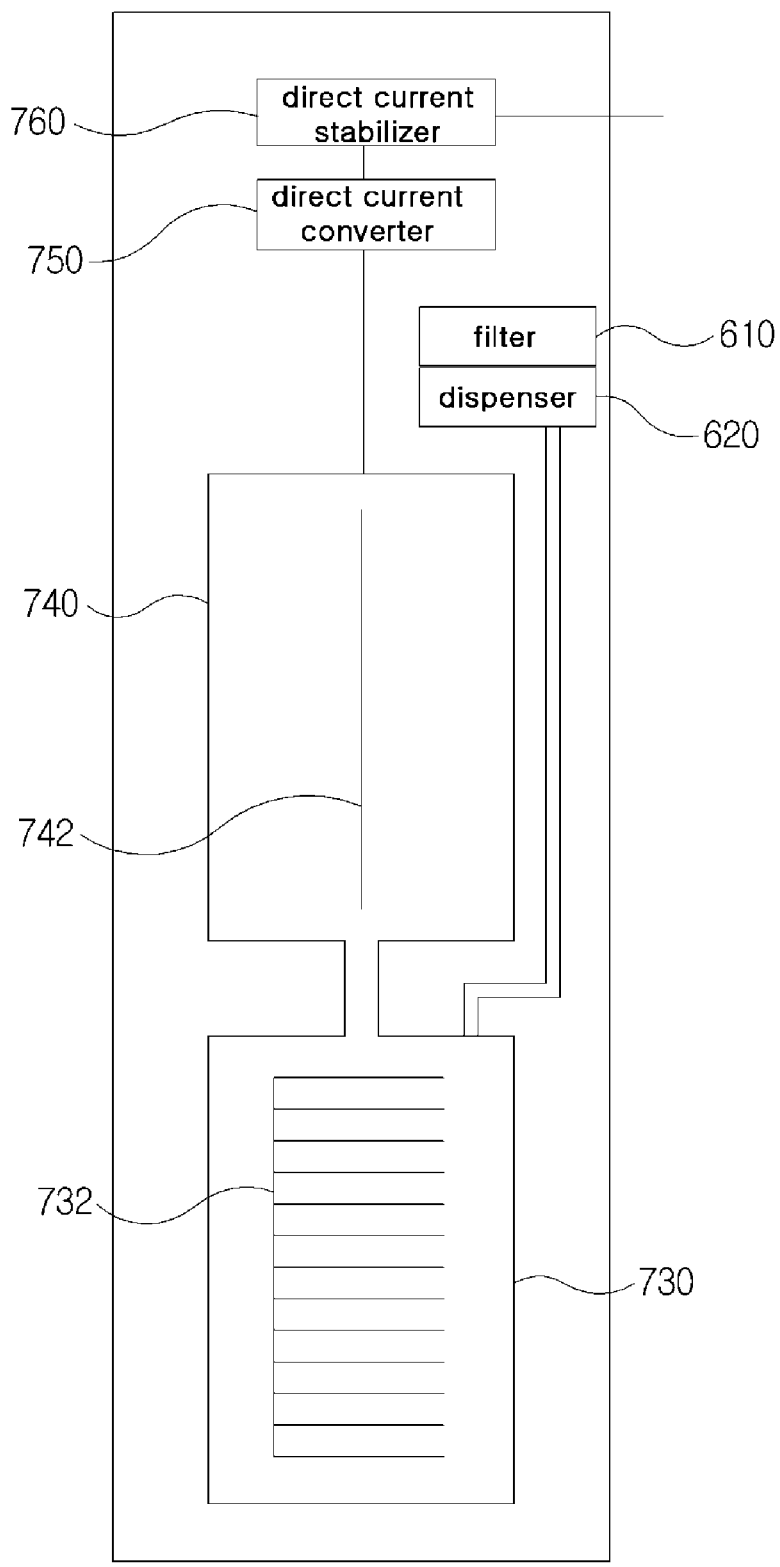
FIG. 7 illustrates schematically an electric power generation system for a water storage tank according to another embodiment of the invention.

FIG. 7 illustrates schematically an electric power generation system for a water storage tank according to another embodiment of the invention.

As shown in FIG. 7, at the interior of the reinforcing column 310, a catalyst module 730, a stack module 740, a direct-current converter 750 and a direct-current stabilizer 760 are provided and further a filter 610 for filtering water stored in a water storage tank into purified water and a dispenser 620 for regulating the amount of water filtered by the filter 610 are provided.

The catalyst module 730 is provided with a catalyst for generating hydrogen by using water. This catalyst can be arranged in the shape of a plate 732 and can also be in the form of powder. A mixed powder comprising hydride powder and oxide powder can be used as a catalyst in the form of powder.

If the catalyst module 730 is supplied with water the supply amount of which is regulated by the dispenser 620, hydrogen, etc., is generated by the catalyst. Hydrogen, etc., generated in the catalyst module 730 is provided to the stack module 740 through a connected supply pipe.

In the stack module 740, an oxidation-reduction reaction occurs by hydrogen, etc., generated in the catalyst, and ions and charges are supplied to an electrode 742.

Ions or charges generated at the electrode 742 of the stack module 740 are supplied to the direct-current converter 750 and the direct-current converter 750 converts ions or charges into a direct-current (DC) power having a defined voltage or current. The direct-current power converted by the direct-current converter 750 is supplied to the direct-current stabilizer 760 and then the direct-current stabilizer 760 regulates the direct-current power converted in the direct-current converter 750 into the more stable power.

Figure 8:
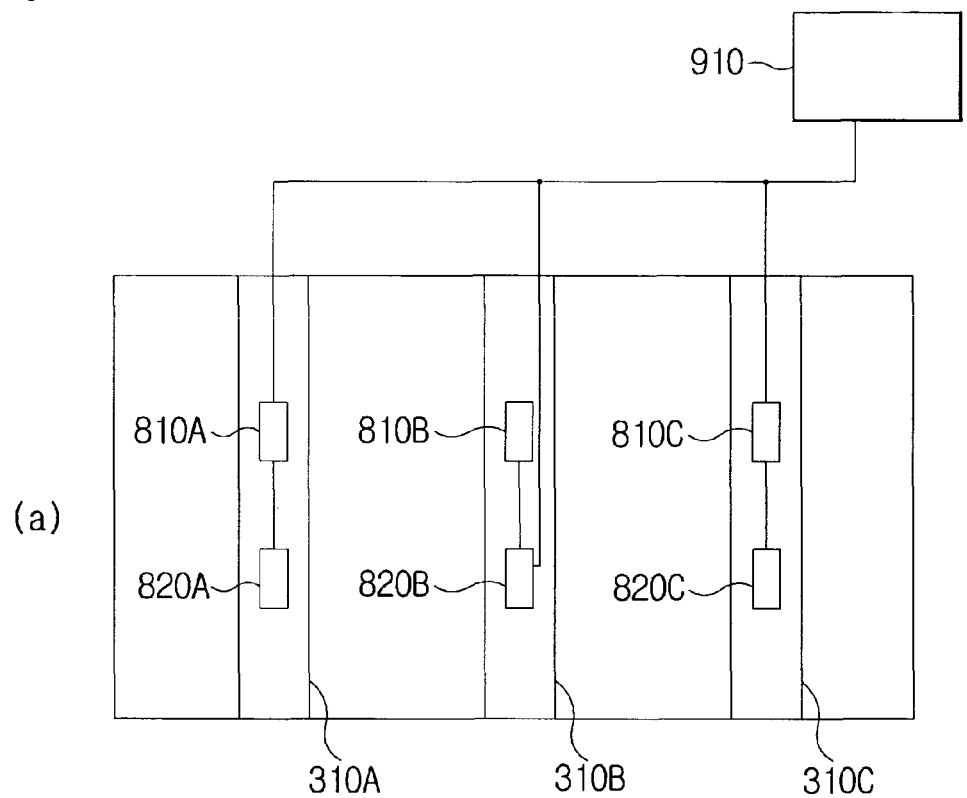
FIG. 8 is a drawing which illustrates the arrangement of electrodes in case of an electric power generation according to FIGS. 6 and 7.
Figure 8:
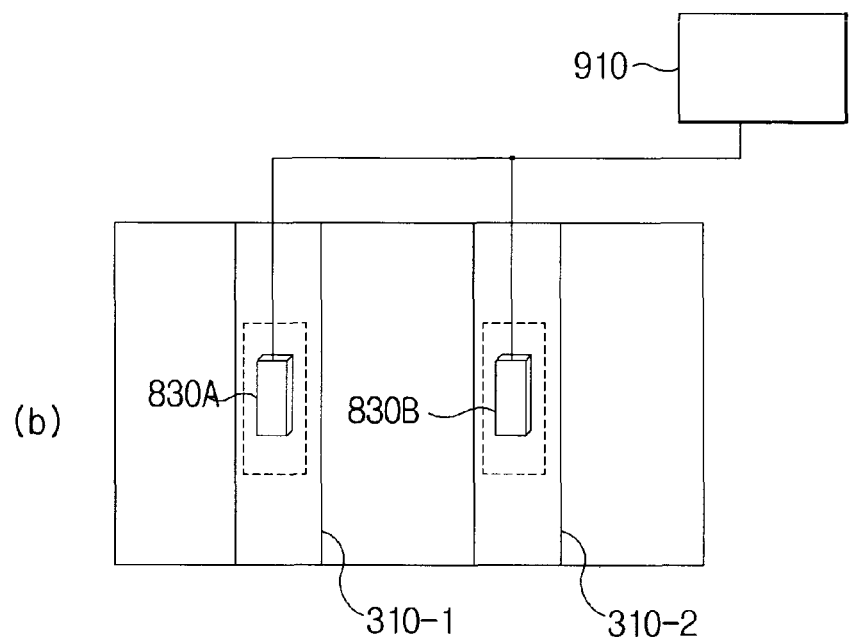

FIG. 8 is a drawing which illustrates the arrangement of electrodes in case of an electric power generation according to FIGS. 6 and 7.

FIG. 8(a) illustrates the configuration of a first electrode and a second electrode arranged in each of the reinforcing columns 310. That is, in the water storage tank a plurality of reinforcing columns 310A, 310B and 310C can be arranged and each of reinforcing columns 310 is provided with the first electrodes 810A, 810B and 810C and the second electrodes 820A, 820B and 820C, respectively. Each of reinforcing columns 310 itself can generate and output electric power. Electric power output by each of the reinforcing columns 310A, 310B and 310C can be connected in series and in parallel and supplied to a charging module 910.

Meanwhile, only one electrode can be arranged in each of the reinforcing columns 310 and such a structure is shown in FIG. 8(b). That is, for example, a reinforcing column 310-1 can be provided with the first electrode 830-A and a reinforcing column 310-2 can be provided with the second electrode 830-B.

According to such a configuration, by arranging a plurality of reinforcing column 310-1 provided with the first electrode 830-A and a plurality of reinforcing column 310-2 provided with the second electrode 830-B within the water storage tank, electric power generated in each reinforcing column can be provided to the charging module 910.

Figure 9:
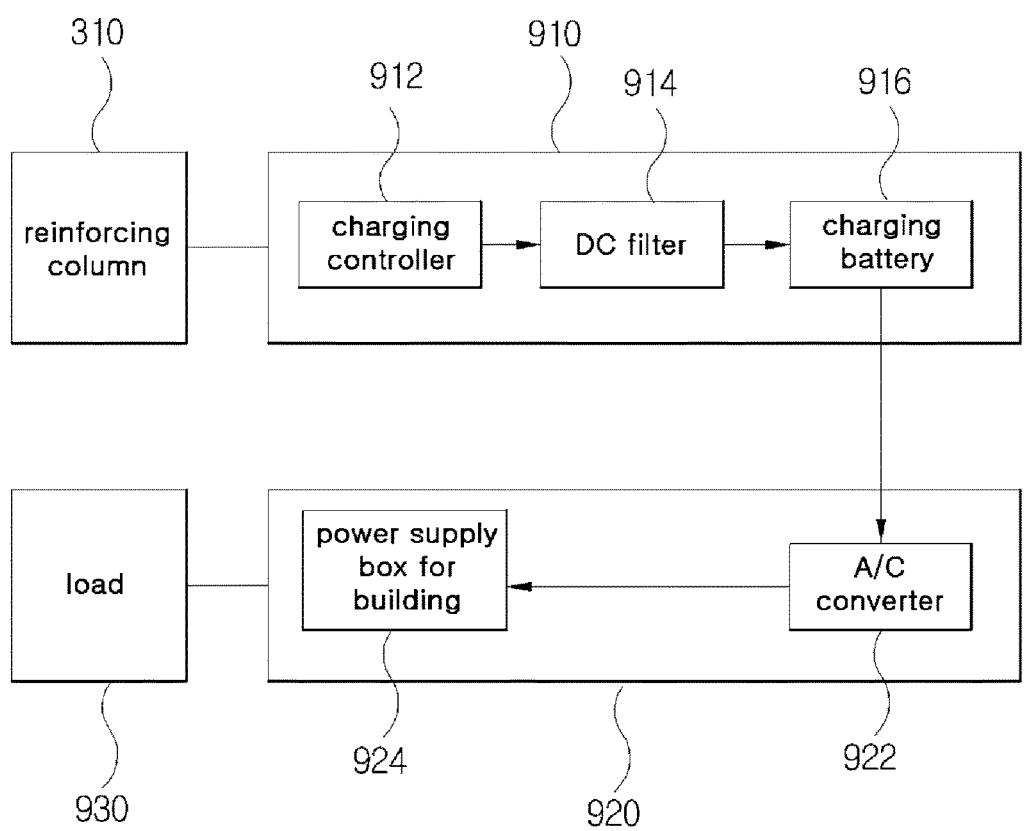
FIG. 9 is a schematic block diagram which illustrates an electric power generation system according to one embodiment of the invention.

FIG. 9 schematically illustrates an electric power generation system according to one embodiment of the invention.

As shown in FIG. 9, an electric power generation system includes the catalyst module 630 and the stack module 640, etc., arranged in the interior of the reinforcing column 310 and the charging module 910 and a conversion module 920 arranged in the exterior of the reinforcing column 310.

Electric power generated within the reinforcing column 310 is supplied to the charging module 910 wherein the charging module 910 includes a charging controller 912, a DC filter 914, and a charging battery 916.

The charging controller 912 switches charging for the charging battery 916. That is, if rainwater is not sufficiently stored in the water storage tank, sufficient water for generation does not sufficiently flow into the reservoir of the catalyst module 630, thereby not being able to output electric power in the catalyst module 630. In this case, electric power stored in the charging battery 916 can rather flow reversely (back) to the catalyst module 630 and thus the charging controller 912 can function to shut off this phenomenon. That is, the charging controller 912 controls electric power such that electric power output from the catalyst module 630 can flow from the catalyst module 630 to the side of the charging battery only when the electric power is higher than that stored in the charging battery 916.

The DC filter 914 regulates electric power output from the catalyst module 630 into electric power suitable for charging of the charging battery 916. The charging battery 916 can be a means for charging charge configured to output electric power of a constant voltage to the outside.

Energy charged in the charging battery 916 is supplied to the conversion module 920 wherein the conversion module 920 includes an A/C converter 922 and a power supply box for a building 924. Thereby, energy charged in the charging battery is supplied to the A/C converter 922 and then converted to an alternating current. And electric power is supplied to a load 930 via the power supply box 924 for a building.

Meanwhile, in FIG. 9 in the exterior of the catalyst module 630, i.e., in the exterior of the reinforcing column 310, the charging controller 912, a DC filter 914 and a charging battery 916 of the charging module 910 are arranged but it can be contemplated that these elements all are arranged within the reinforcing column 310.

Figure 10:
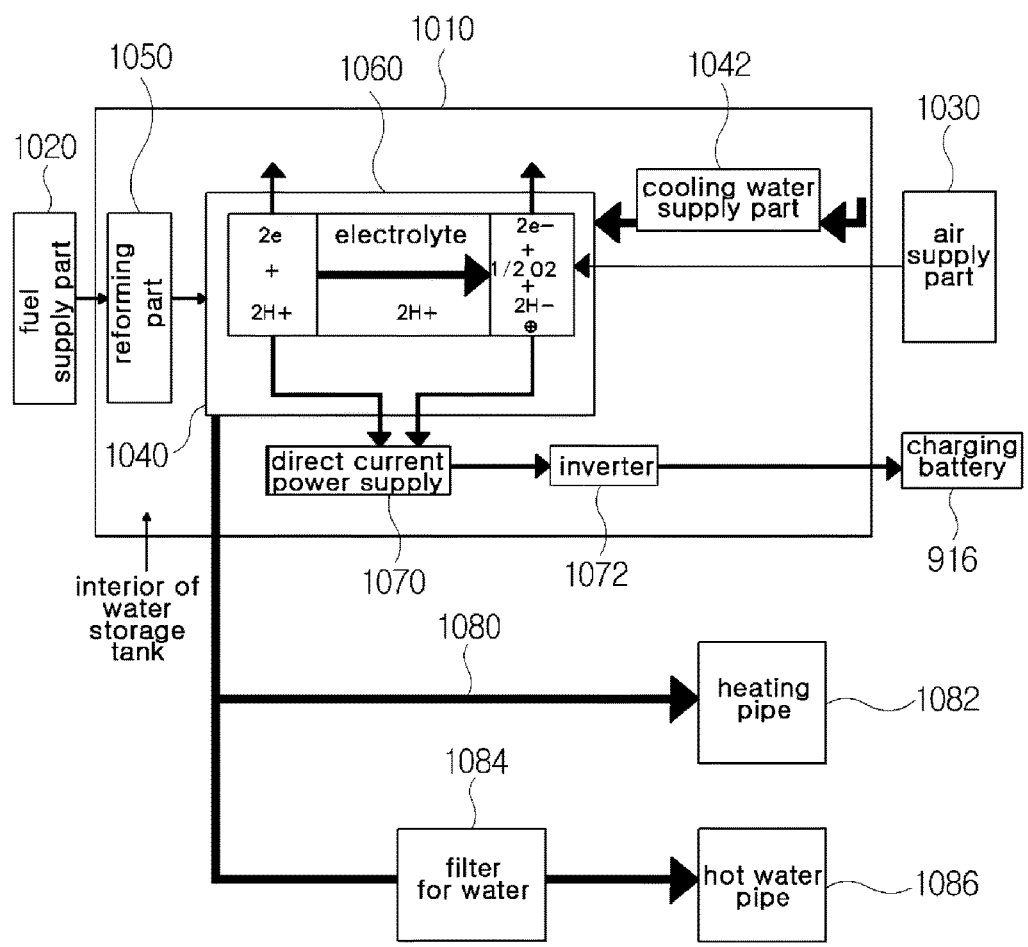
FIG. 10 illustrates schematically an electric power generation system for a water storage tank according to another embodiment of the invention.

FIG. 10 illustrates schematically an electric power generation system for a water storage tank according to another embodiment of the invention.

As shown in FIG. 10, an electric power generation system for a water storage tank includes a fuel cell capsule 1010, a fuel supply part 1020, an air supply part 1030, a cooling part 1040, a cooling water supply part 1042, a reforming part 1050, an electricity generation part 1060, a direct-current power supply 1070 and an inverter 1072.

As described above, the fuel cell capsule 1010 as shown in FIG. 10 can be provided in the interior of the reinforcing column 310 but the fuel cell capsule itself can have a sealed space against water in case there is no reinforcing column in the water storage tank.

The fuel supply part 1020 supply the reforming part 1050 with natural gas, methanol, ethanol and coal gas, etc. Fuel stored in the fuel supply part 1020 is supplied to the reforming part 1050 by means of a fuel supply means (not shown) which is connected with the fuel supply part 1020. Various pumps such as a diaphragm pump and a motor-driven pump can be used as the fuel supply means.

The air supply part 1030 is connected with an electricity generation part 1060 and thus serves to supply the electricity generation part 1060 with oxygen-containing gas. The air supply part 1030 is preferably formed of an air compressor which supplies oxygen-containing air and serves to supply air with a defined supply pressure. Therefore, the air supply part 1030 serves to supply oxygen to a cathode electrode of the electricity generation part 1060, thereby causing an electrochemical reaction to occur at the electricity generation part 1060.

The cooling part 1040 serves to cool heat generated from the electricity generation part 1060. Water heated during cooling of heat generated from the electricity generation part 1060 can be supplied to a heating pipe 1082 or a hot water pipe 1086 of a building or a house via a hot water pipe for heat utilization etc. The cooling water supply part 1042 serves to supply the cooling part 1040 with a cooling water and for this purpose, uses water in the water storage tank. 122

The reforming part 1050 serves to generate hydrogen gas containing hydrogen as a main component by reforming a hydrogen-containing fuel and supply it to the electricity generation part 1060. The reforming part 1050 can be classified into a steam reforming method, a natural reforming method, a partial oxidation method according to a reforming method. While the partial oxidation method and the natural reforming method are excellent in characteristics responding to an initial starting and a load variation, the steam reforming method is excellent in hydrogen production efficiency. The steam reforming method obtains a reforming gas containing hydrogen as a main element, i.e., hydrogen gas by means of a chemical reaction of fuel and steam, i.e., a chemical catalyst reaction according to thermal energy. In the steam reforming method a large amount of thermal energy is required from the outside in order to perform a chemical catalyst reaction according to the thermal energy but a reforming gas supply is stable and hydrogen of relatively high concentration can be obtained.

The reforming gas generated from the reforming part 1050 can contain steam, a trace of carbon monoxide, carbon dioxide and methane gas as well as hydrogen gas of a main element wherein steam is separated by means of a separate gas-liquid separator (not shown) and only hydrogen gas is supplied to the electricity generation part 1060. In addition, carbon monoxide poisons a platinum catalyst used for an electrode of the electric power generation portion 1060, thereby leading to deterioration in performance of the electric power generation system. Thus, carbon monoxide is removed by using a separate carbon monoxide removal means (not shown).

The electricity generation part 1060 serves to generate electricity by an electrochemical reaction of hydrogen and oxygen supplied from the outside. More specifically, the electricity generation part includes a fuel cell stack formed by stacking a number of part cells wherein the part cell comprises a membrane electrode assembly and two bipolar plates arranged at both sides of the membrane electrode assembly. The fuel cell stack structure can be a helical type or a cylindrical type in case it is arranged within a cylinder.

The membrane electrode assembly is formed by stacking electrolyte membranes between an anode electrode (fuel electrode) and a cathode electrode (air electrode). The anode electrode and cathode electrode includes a fuel diffusion layer for supply and diffusion of fuel; a catalyst layer in which an oxidation/reduction reaction of fuel occurs; and an electrode support body. The anode electrode serves to separate electrons and hydrogen ions from fuel supplied, the electrolyte membrane serves to transfer hydrogen ions to the cathode electrode. The cathode electrode serves to generate water by reacting electrons and hydrogen supplied from the anode electrode with oxygen. Therefore, the electricity generation part 1060 serves to generate electric energy by means of an electrochemical reaction of hydrogen and oxygen.

A direct-current power supply 1070 generated from the electricity generation 1060 is charged into an exterior charging battery 916 via the inverter 1072.

The electric power generation system according to FIG. 10 can generate electricity and also cool the electricity generation part 1060 by utilizing water in the water storage tank and can use water heated at this time as hot water or heating water of a building or a house, thereby being able to enhance the efficiency of electric power generation up to 80%.

Figure 11:
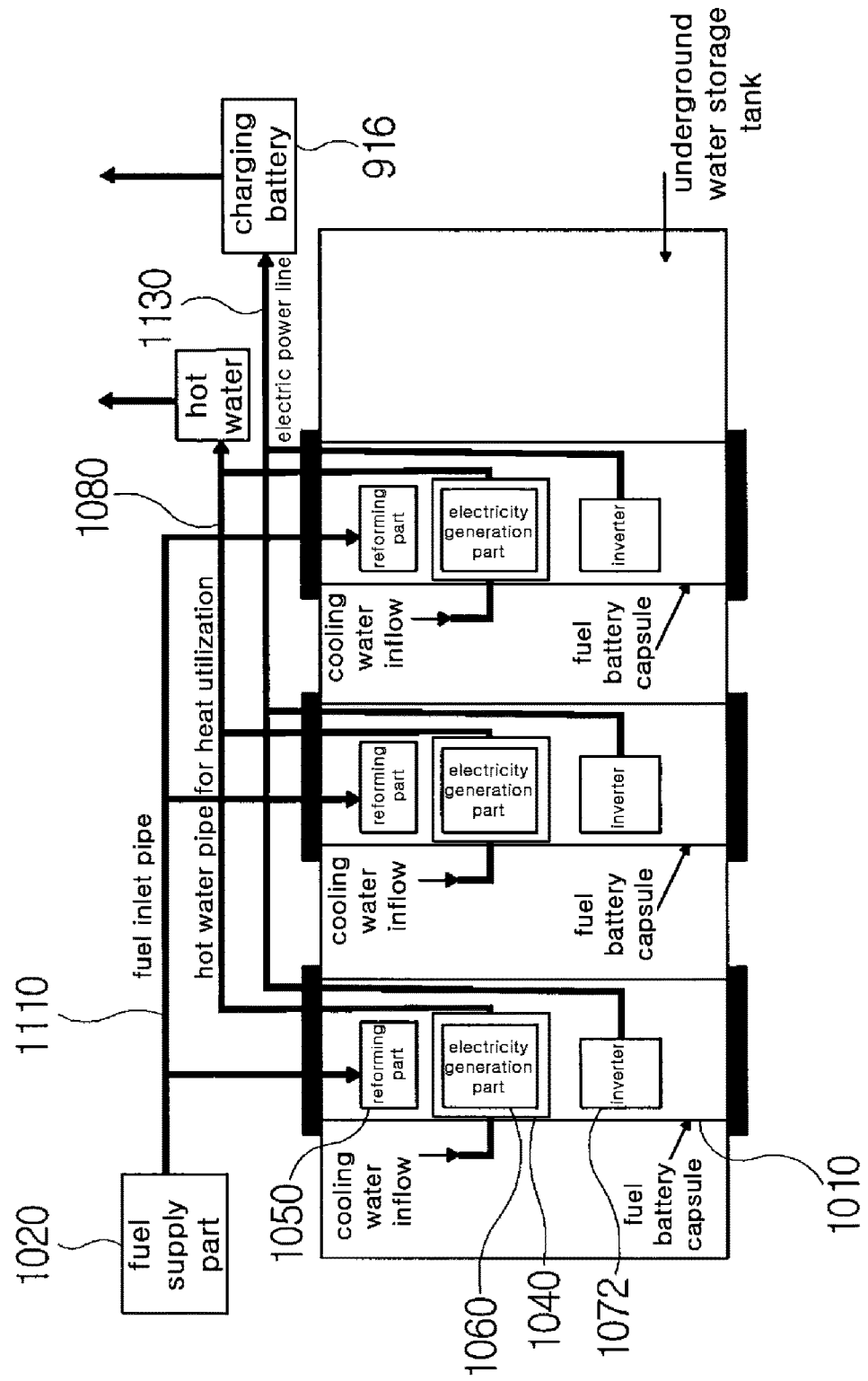
FIG. 11 illustrates the configuration comprising a plurality of electric power generation systems wherein the electric power generation system is shown in FIG. 10.

FIG. 11 illustrates the configuration comprising a plurality of electric power generation systems wherein the electric power generation system is shown in FIG. 10.

Each fuel cell capsule includes a cooling part 1040, a reforming part 1050, an electricity generation part 1060, a direct-current power supply 1070 and an inverter 1072 as shown in FIG. 10. Each fuel cell capsule 1010 is supplied with fuel from the fuel supply part 1020 via the fuel inlet pipe 1110. In addition, the hot water pipe for heat utilization 1080 is connected with each cooling part 1040 and thus water heated can be supplied to a building or a house.

Also, electric power of each inverter 1072 is connected with the charging battery 916 via a power line 1030. Furthermore, electric power generated by wind power or a solar cell (not shown) as well as electric power of each inverter 1072 can be further charged into the charging battery 916.

Figure 12:
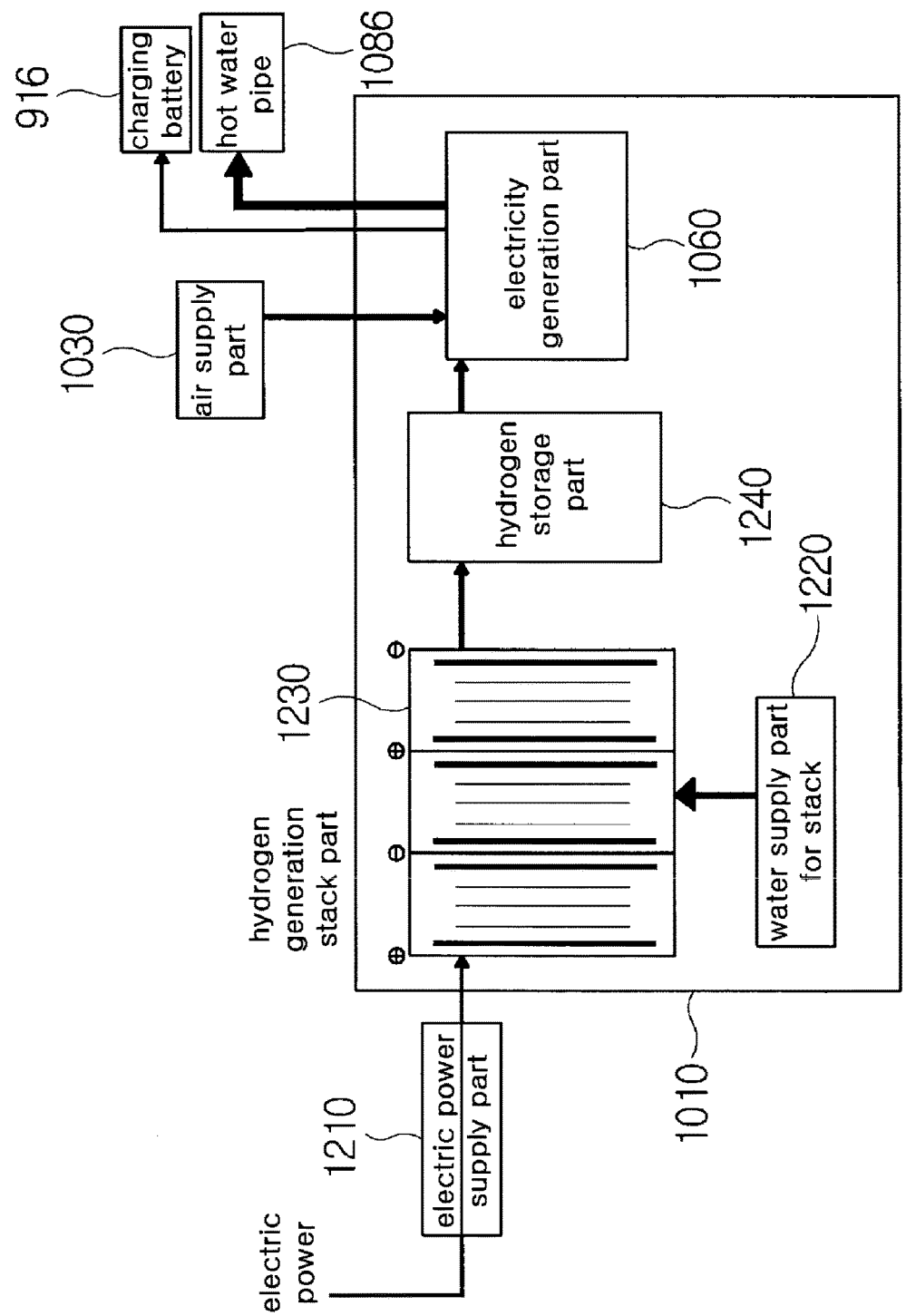
FIG. 12 illustrates schematically an electric power generation system for a water storage tank according to yet another embodiment of the invention.

FIG. 12 illustrates schematically an electric power generation system for a water storage tank according to yet another embodiment of the invention.

As shown in FIG. 12, an electric power generation system for a water storage underground tank using a fuel cell includes a water storage tank 1010, an electric power supply part 1210, a air supply part 1030, a water supply part for a stack 1220, a hydrogen generation stack part 1230, a hydrogen storage part 1240 and an electricity generation part 1060.

The electric power supply part 1210 is intended to supply electricity to the hydrogen generation stack part 1230 and can include a charging battery (not shown). Electric power charged into the charging battery can be electric power generated by means of wind power or a solar cell (not shown). The water supply part for a stack 1220 is intended to supply water to the hydrogen generation stack part 1230 and can include a filter for filtering water of the water storage tank.

The hydrogen generation stack part 1230 is intended to generate hydrogen by utilizing water supplied from the water supply part for a stack 1220 and electricity supplied from the electric power supply part 1210. Hydrogen generated from the hydrogen generation stack part 1230 is stored in the hydrogen storage part 1240.

The electricity generation part 1060 is intended to generate electricity by means of an electrochemical reaction of hydrogen and oxygen supplied from the outside. More particularly, the electricity generation part includes a fuel cell stack formed by stacking a number of part cells wherein the part cell comprises a membrane electrode assembly and two bipolar plates arranged at both sides of the membrane electrode assembly. The membrane electrode assembly is formed by stacking electrolyte membranes between an anode electrode (hydrogen electrode) and a cathode electrode (oxygen electrode). The anode electrode serves to separate electrons and hydrogen ions from hydrogen supplied and the electrolyte membrane serves to transfer hydrogen ions to the cathode electrode. The cathode electrode serves to generate water by reacting electrons and hydrogen supplied from the anode electrode with oxygen. Therefore, the electricity generation part 1060 serves to generate electric energy by means of an electrochemical reaction of hydrogen and oxygen.

According to the rainwater storage tank constructed on the basis of the storage structure for a water storage tank, there is no need to install any structures on the ground because they already have been installed underground. And as rainwater discharged into the sea is stored and the stored water is again utilized, the rainwater storage tank is useful for the future-oriented city. In particular, as electricity can be generated by means of an unlimited amount of discharged water, eco-friendly and unlimited energy can be generated.

For an urban dispersed water storage tank for the flood prevention and the reutilization of water, due to underground installation of the fuel cell which utilizes open underground spaces of the water storage tank, security of high urban space utilization efficiency, security of dispersed electricity generation facilities and supply of hot water and heating water by utilization of water in the water storage tank can be realized.

The above description is simply illustrative of the technical concept of the invention and a person skilled in the art can make considerable modifications, alterations and equivalents in form and functions without departing beyond the scope of the invention. Therefore, since the embodiments disclosed in the invention is not intended to limit the scope of the invention but to describe the invention, the scope of the invention should not be limited by these embodiments. The scope of the invention should be interpreted on the basis of the following claims and all technical concepts within the equivalent range thereof should be interpreted as being included in the scope of the invention.

The invention is applicable to an electric power generation system for a water storage tank capable of generating electric power from the storage structure of a water storage tank storing rainwater, etc., and a storage structure system for a water storage tank having an electric power generation apparatus and being reinforced in vertical strength and distortion strength in the horizontal direction.

What is claimed is:

1. A storage structure system for a water storage tank having reinforced strength and having an electric power generation function comprising:
    a first unit member including a first base portion arranged on a bottom ground of the water storage tank and a first container portion arranged such that it is integrally and vertically projected from the first base portion;
    a second unit member comprising a second base portion arranged on a ceiling of the water storage tank and covered with soil and a second container portion protruded vertically from the second base portion;
    a reinforcing column provided in order to reinforce vertical strength, in the interior of the first container portion and the second container portion formed vertically in the center of the first unit member and the second unit member; and
    an electric power generation system for generating electric power, said electric power generation system being inside of the reinforcing column and in fluid connection with the water storage tank whereby electric power may be generated utilizing water supplied to the electricity generation system from the water storage tank.

2. The storage structure system for a water storage tank according to claim 1 wherein the reinforcing column is formed by interconnecting an upper partition column, at least one medium partition column and a lower partition column.

3. The storage structure system for a water storage tank according to claim 2 wherein the upper partition column of the reinforcing column is provided with an upper seat plate for supporting a ceiling of the water storage tank and the lower partition column of the reinforcing column is provided with a lower seat plate for supporting a bottom of the water storage tank.

4. The storage structure system for a water storage tank according to claim 2 wherein the upper partition column, the middle partition column and the lower partition of the reinforcing column are connected by means of a screw combination; and the middle partition column is adjustable in length.

5. The storage structure system for a water storage tank according to claim 1 wherein the electric power generation system comprises an electricity generation part for generating electricity by means of an electrochemical reaction of hydrogen and oxygen; a cooling part for cooling heat generated at the time of generating electricity by the electricity generation part; and a cooling water supply part for supplying the cooling part with water stored in the water storage tank.

6. The storage structure system for a water storage tank according to claim 5 wherein the electric power generation system further comprises: a filter for filtering water flowing into the interior of the reinforcing column; a stack module including the electricity generation part; and a catalyst module for supplying the stack module with hydrogen wherein the hydrogen is generated by utilizing water filtered by the filter.

7. The storage structure system for a water storage tank according to claim 5 wherein the electric power generation system further comprises: a fuel supply part for supplying fuel including hydrogen; and a reforming part for supplying the electricity generation part with hydrogen obtained from fuel which is supplied from the fuel supply part.

8. The storage structure system for a water storage tank according to claim 6 wherein the electric power generation system further comprises: a hydrogen generation stack part for generating hydrogen by using the water supplied from a water supply and the electricity supplied from an electric power supply part; and a hydrogen storage part for storing hydrogen generated from the hydrogen generation stack part.

9. The storage structure system for a water storage tank according to claim 8 wherein the electric power generated by means of wind power or a solar cell is charged into a charging battery for the electric power supply part.

\* \* \* \* \*